United States Patent
Newman et al.

(10) Patent No.: US 12,244,334 B2
(45) Date of Patent: Mar. 4, 2025

(54) SELECTING A MODULATION SCHEME TO MITIGATE SPECIFIC FAULT TYPES IN 5G AND 6G

(71) Applicants: David E. Newman, Poway, CA (US); R. Kemp Massengill, Palos Verdes, CA (US)

(72) Inventors: David E. Newman, Poway, CA (US); R. Kemp Massengill, Palos Verdes, CA (US)

(*) Notice: Subject to any disclaimer, the term of this patent is extended or adjusted under 35 U.S.C. 154(b) by 0 days.

(21) Appl. No.: 18/227,942

(22) Filed: Jul. 30, 2023

(65) Prior Publication Data

US 2023/0387952 A1 Nov. 30, 2023

Related U.S. Application Data

(63) Continuation of application No. 18/117,535, filed on Mar. 6, 2023, now Pat. No. 11,777,547, which is a continuation of application No. 17/979,813, filed on Nov. 3, 2022, now Pat. No. 11,601,150.

(60) Provisional application No. 63/418,784, filed on Oct. 24, 2022, provisional application No. 63/412,654, filed on Oct. 3, 2022, provisional application No. 63/409,888, filed on Sep. 26, 2022, provisional application No. 63/403,924, filed on Sep. 6, 2022, provisional application No. 63/321,879, filed on Mar. 21, 2022, provisional application No. 63/309,748, filed on Feb. 14, 2022, provisional application No. 63/280,281, filed on Nov. 17, 2021.

(51) Int. Cl.
*H04B 1/12* (2006.01)
*H04L 27/38* (2006.01)

(52) U.S. Cl.
CPC ........... *H04B 1/12* (2013.01); *H04L 27/3872* (2013.01)

(58) Field of Classification Search
CPC .... H04B 1/12; H04B 27/362; H04B 27/3872; H04L 27/361; H04L 27/389
See application file for complete search history.

(56) References Cited

U.S. PATENT DOCUMENTS

| | | | |
|---|---|---|---|
| 5,828,695 A | 10/1998 | Webb | |
| 9,939,833 B2 * | 4/2018 | Stanczak | G05F 3/02 |
| 11,695,509 B2 * | 7/2023 | Sarkis | H04W 72/0446 370/329 |
| 12,003,323 B2 * | 6/2024 | Newman | H04L 1/0046 |
| 2002/0114379 A1 | 8/2002 | Jesugi | |
| 2004/0114692 A1 | 6/2004 | Matsumoto | |
| 2007/0297534 A1 | 12/2007 | Okunev | |
| 2008/0112509 A1 | 5/2008 | Bock et al. | |

(Continued)

*Primary Examiner* — Dac V Ha

(57) ABSTRACT

Reliable communications is a central goal of 5G and 6G. However, due to signal fading at high frequencies and interference due to crowding, message faults continue to be a problem. Disclosed are methods for base station and user devices to adjust the modulation scheme according to the types of faults received, including amplitude faults (incorrectly demodulated amplitude levels) and phase faults (incorrectly demodulated phase levels), among others. The base station can select a more suitable modulation scheme based on the types of faults observed by user devices, such as modulation schemes with more or fewer amplitude levels and phase levels. In some versions, the number of amplitude levels is different from the number of phase levels, to combat specific fault problems.

20 Claims, 8 Drawing Sheets

(56) References Cited

U.S. PATENT DOCUMENTS

| | | |
|---|---|---|
| 2011/0044160 A1 | 2/2011 | Mujtaba |
| 2012/0281988 A1 | 11/2012 | Kikuchi |
| 2017/0180179 A1 | 6/2017 | Shi |
| 2017/0373909 A1 | 12/2017 | Hermando |
| 2018/0132122 A1 | 5/2018 | Yoo |
| 2018/0227929 A1 | 8/2018 | Yoo |
| 2018/0367275 A1 | 12/2018 | Nammi |
| 2019/0190677 A1 | 6/2019 | Kim |
| 2019/0326964 A1 | 10/2019 | Li |
| 2020/0220689 A1 | 7/2020 | Hessler |
| 2020/0220763 A1 | 7/2020 | Montorsi |
| 2020/0322010 A1 | 10/2020 | Kim |
| 2020/0412592 A1 | 12/2020 | Akkarakaran |
| 2021/0044372 A1 | 2/2021 | Yang |
| 2021/0105166 A1 | 4/2021 | Khoshnevisan |
| 2021/0376978 A1 | 12/2021 | Paz |

* cited by examiner

FIG. 5A
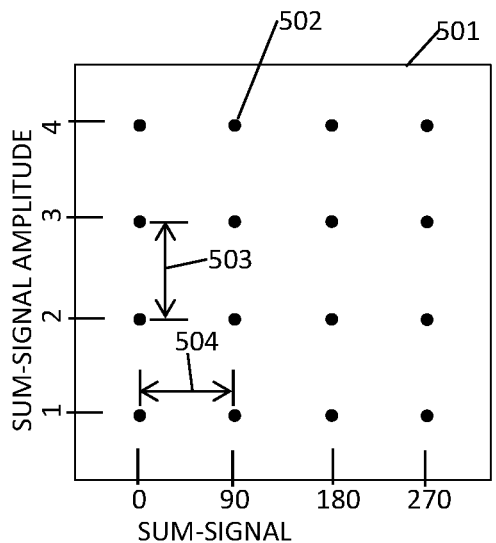
FIG. 5B
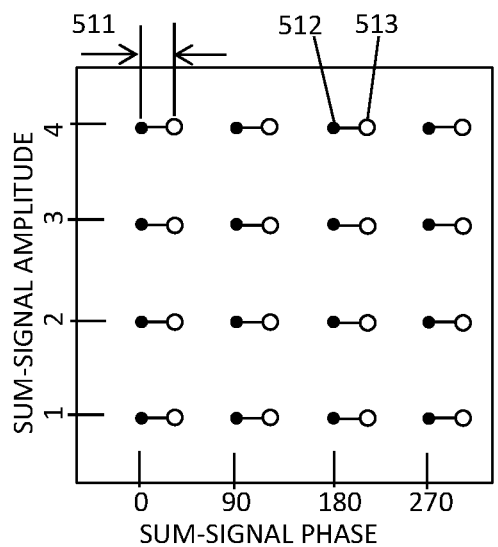
FIG. 5C
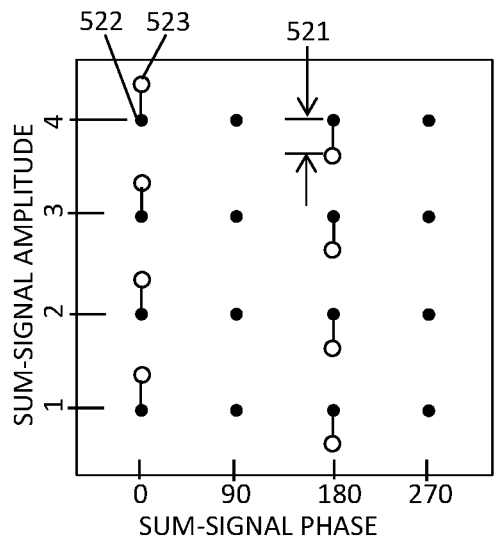
FIG. 5D
551 - Measure amplitude noise and phase noise using demodulation reference.
552 - Subtract phase rotation angle from sum-signal phase. Corect the sum-signal amplitude according to amplitude noise and relative phase.

FIG. 9

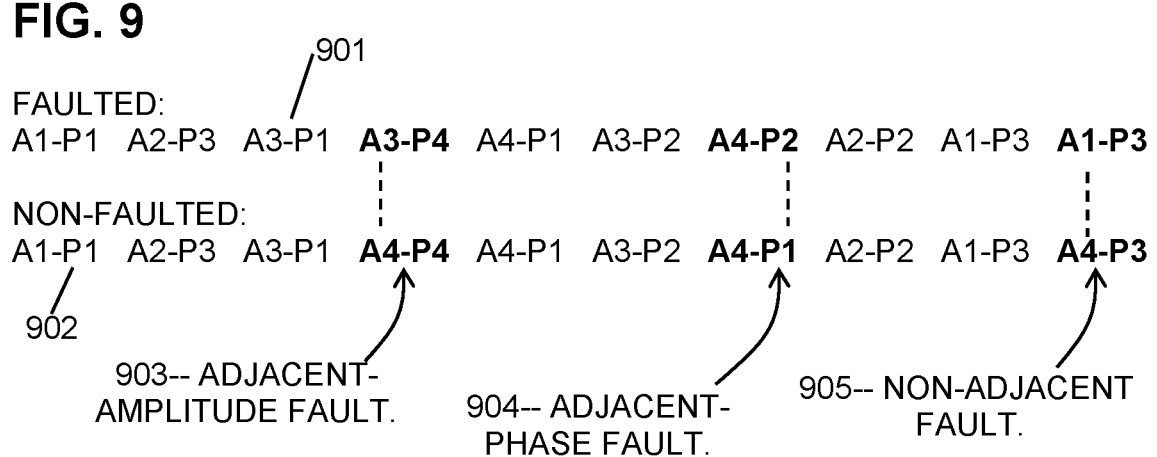

FAULTED:
A1-P1  A2-P3  A3-P1  A3-P4  A4-P1  A3-P2  A4-P2  A2-P2  A1-P3  A1-P3

NON-FAULTED:
A1-P1  A2-P3  A3-P1  A4-P4  A4-P1  A3-P2  A4-P1  A2-P2  A1-P3  A4-P3

902

903-- ADJACENT-AMPLITUDE FAULT.

904-- ADJACENT-PHASE FAULT.

905-- NON-ADJACENT FAULT.

FIG. 10

| FAULT PATTERN | MITIGATION OPTIONS |
|---|---|
| ADJACENT-AMPLITUDE | REDUCE NUMBER OF AMPLITUDE LEVELS. |
| ADJACENT-PHASE | REDUCE NUMBER OF PHASE LEVELS. |
| NON-ADJACENT FAULTS | INCREASE NUMBER OF AMPLITUDE AND PHASE LEVELS, FASTER MESSAGES. |
| FAULTS THROUGHOUT TABLE | INCREASE TRANSMISSION POWER. |

US 12,244,334 B2

SELECTING A MODULATION SCHEME TO MITIGATE SPECIFIC FAULT TYPES IN 5G AND 6G

PRIORITY CLAIMS AND RELATED APPLICATIONS

This application is a continuation of U.S. patent application Ser. No. 18/117,535, entitled "Phase-Tracking Demodulation Reference and Procedure for 5G and 6G", filed Mar. 6, 2023, which is a continuation of U.S. patent application Ser. No. 17/979,813, entitled "Demodulation for Phase-Noise Mitigation in 5G and 6G", filed Nov. 3, 2022, which claims the benefit of U.S. Provisional Patent Application Ser. No. 63/418,784, entitled "Demodulation for Phase-Noise Mitigation in 5G and 6G", filed Oct. 24, 2022, and U.S. Provisional Patent Application Ser. No. 63/412,654, entitled "Guard-Space Phase-Tracking Reference Signal for 5G and 6G Networking", filed Oct. 3, 2022, and U.S. Provisional Patent Application Ser. No. 63/403,924, entitled "Phase-Noise Mitigation at High Frequencies in 5G and 6G", filed Sep. 6, 2022, and U.S. Provisional Patent Application Ser. No. 63/409,888, entitled "Single-Branch Reference for High-Frequency Phase Tracking in 5G and 6G", filed Sep. 26, 2022, and U.S. Provisional Patent Application Ser. No. 63/321,879, entitled "Low-Complexity Demodulation of 5G and 6G Messages", filed Mar. 21, 2022, and U.S. Provisional Patent Application Ser. No. 63/309,748, entitled "Error Detection and Correction in 5G/6G Pulse-Amplitude Modulation", filed Feb. 14, 2022, and U.S. Provisional Patent Application Ser. No. 63/280,281, entitled "Error Detection and Correction by Modulation Quality in 5G/6G", filed Nov. 17, 2021, all of which are hereby incorporated by reference in their entireties.

FIELD OF THE INVENTION

The disclosure pertains to phase-noise mitigation in wireless messaging, and particularly to phase-noise mitigation at high frequencies.

BACKGROUND OF THE INVENTION

Wireless communication at very high frequencies, such as tens to hundreds of GHz, is needed for the massively increased demand in bandwidth and throughput expected in 5G and 6G. However, phase noise is an increasing problem at higher frequencies, preventing full usage of the bandwidth for messaging. What is needed is means for mitigating the phase noise so that the promise of high-speed messaging at high frequencies can be at least partially realized.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY OF THE INVENTION

In a first aspect, there is a method for a base station of a wireless network to communicate with a user device of the wireless network, the method comprising: determining or receiving a data message to be transmitted to the user device; modulating each message element of the data message according to a first modulation scheme, each message element occupying a single resource element of a resource grid comprising symbol-times in time and subcarriers in frequency; transmitting the data message, so modulated, to the user device; receiving an uplink message from the user device, the uplink message indicating which particular type of message faults, of a plurality of predetermined fault types, were received; and selecting a second modulation scheme configured to avoid the particular type of message faults.

In another aspect, there is a method for a wireless receiver to receive a message comprising message elements, each message element occupying exactly one resource element of a resource grid, the method comprising: using a modulation scheme comprising amplitude modulation multiplexed with phase modulation, the amplitude modulation according to integer Namp predetermined amplitude levels and the phase modulation according to integer Nphase predetermined phase levels; receiving a demodulation reference comprising a first resource element and a second resource element, wherein the first resource element comprises a maximum amplitude level of the Namp predetermined amplitude levels and a particular predetermined phase level of the Nphase phase levels, and wherein the second resource element comprises zero transmission; receiving the message comprising message elements; demodulating each message element by comparing an amplitude of the message element to the Namp predetermined amplitude levels and comparing a phase of the message element to the Nphase predetermined phase levels.

In another aspect, there is a method for a base station of a wireless network to communicate with a user device of the network, the method comprising: selecting a first modulation scheme comprising amplitude modulation multiplexed with phase modulation, the amplitude modulation comprising integer Namp predetermined amplitude levels and the phase modulation comprising integer Nphase predetermined phase levels; transmitting a downlink message to the user device according to the first modulation scheme; receiving, from the user device, an uplink message indicating a number or rate of faults and one or more types of the faults; and selecting a second modulation scheme configured to mitigate the type or types of faults indicated by the user device.

This Summary is provided to introduce a selection of concepts in a simplified form. The concepts are further described in the Detailed Description section. Elements or steps other than those described in this Summary are possible, and no element or step is necessarily required. This Summary is not intended to identify key features or essential features of the claimed subject matter, nor is it intended for use as an aid in determining the scope of the claimed subject matter. The claimed subject matter is not limited to implementations that solve any or all disadvantages noted in any part of this disclosure.

These and other embodiments are described in further detail with reference to the figures and accompanying detailed description as provided below.

BRIEF DESCRIPTION OF THE DRAWINGS

FIG. 5A is an exemplary embodiment of a sum-signal modulation table, according to some embodiments.

FIG. 5B is an exemplary embodiment of a sum-signal modulation table including phase noise, according to some embodiments.

FIG. 5C is an exemplary embodiment of a sum-signal modulation table including amplitude noise, according to some embodiments.

FIG. 5D is a flowchart showing an exemplary embodiment of a method to mitigate amplitude noise and phase noise in sum-signals, according to some embodiments.

FIG. 9 is a schematic showing an exemplary embodiment of a message with various types of faults, according to some embodiments.

FIG. 10 is a schematic showing an exemplary embodiment of a method to select a modulation table based on types of faults observed, according to some embodiments.

Like reference numerals refer to like elements throughout.

DETAILED DESCRIPTION

Figure 1A:
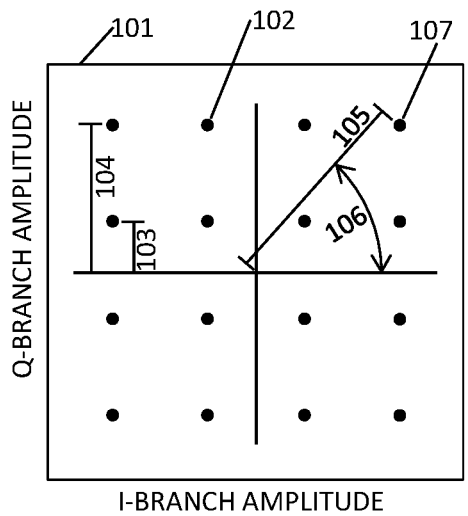
FIG. 1A is a schematic showing an exemplary embodiment of a 16QAM constellation chart, according to some embodiments.

Systems and methods disclosed herein (the "systems" and "methods", also occasionally termed "embodiments" or "arrangements" or "versions" or "examples", generally according to present principles) can provide urgently needed wireless communication protocols for mitigating the effects of phase noise at high frequencies planned for late 5G and 6G communications. Disclosed herein is a "sum-signal demodulation method" to demodulate a message with enhanced noise margin for phase noise and, in some cases, for amplitude noise as well, according to some embodiments. The sum-signal of a message element is the vector sum of two orthogonal branch amplitudes, and represents the overall amplitude and phase of the received waveform. Examples show how the sum-signal is related to the branch signals of QAM. Further examples demonstrate advantages in correcting for phase noise and, separately, for amplitude noise, using sum-signal techniques. Further examples show how to diagnose message faults according to sum-signal amplitude and phase deviations, and how to select a different modulation table to combat various types of faults. In summary, to achieve enhanced noise margins: (a) a transmitter modulates the amplitude and phase of the overall waveform of a message element, and transmits it; (b) a receiver receives the waveform and extracts orthogonal I and Q branch signals; (c) the receiver measures the I and Q branch amplitudes, and calculates the resultant sum-signal amplitude and phase; (d) the message is then demodulated using predetermined sum-signal amplitude and phase levels.

The examples presented below are suitable for adoption by a wireless standards organization. Providing a sum-signal modulation option with enhanced phase-noise tolerance, as a standard, may enable high-frequency operation with enhanced reliability, at zero or negligible cost in power and resources, greatly benefitting future 5G/6G wireless users worldwide.

Terms herein generally follow 3GPP (third generation partnership project) standards, but with clarification where needed to resolve ambiguities. As used herein, "5G" represents fifth-generation, and "6G" sixth-generation, wireless technology in which a network (or cell or LAN Local Area Network or RAN Radio Access Network or the like) may include a base station (or gNB or generation-node-B or eNB or evolution-node-B or AP Access Point) in signal communication with a plurality of user devices (or UE or User Equipment or user nodes or terminals or wireless transmit-receive units) and operationally connected to a core network (CN) which handles non-radio tasks, such as administration, and is usually connected to a larger network such as the Internet. The time-frequency space is generally configured as a "resource grid" including a number of "resource elements", each resource element being a specific unit of time termed a "symbol period" or "symbol-time", and a specific frequency and bandwidth termed a "subcarrier" (or "subchannel" in some references). Symbol periods may be termed "OFDM symbols" (Orthogonal Frequency-Division Multiplexing) in references. The time domain may be divided into ten-millisecond frames, one-millisecond subframes, and some number of slots, each slot including 14 symbol periods. The number of slots per subframe ranges from 1 to 8 depending on the "numerology" selected. The frequency axis is divided into "resource blocks" (also termed "resource element groups" or "REG" or "channels" in references) including 12 subcarriers, each subcarrier at a slightly different frequency. The "numerology" of a resource grid corresponds to the subcarrier spacing in the frequency domain. Subcarrier spacings of 15, 30, 60, 120, and 240 kHz are defined in various numerologies. Each subcarrier can be independently modulated to convey message information. Thus a resource element, spanning a single symbol period in time and a single subcarrier in frequency, is the smallest unit of a message. "Classical" amplitude-phase modulation refers to message elements modulated in both amplitude and phase, whereas "quadrature" or "PAM" (pulse-amplitude) modulation refers to two signals, separately amplitude-modulated, and then multiplexed and transmitted with a 90-degree phase shift between them. The two signals may be called the "I" and "Q" branch signals (for In-phase and Quadrature-phase) or "real and imaginary" among others. Standard modulation schemes in 5G and 6G include BPSK (binary phase-shift keying), QPSK (quad phase-shift keying), 16QAM (quadrature amplitude modulation with 16 modulation states), 64QAM, 256QAM and higher orders. Most of the examples below relate to QPSK or 16QAM, with straightforward extension to the other levels of modulation. QPSK is phase modulated but not amplitude modulated. 16QAM may be modulated according to PAM which exhibits two phase levels at zero and 90 degrees (or in practice, for carrier suppression, ±45 degrees) and four amplitude levels including two positive and two negative amplitude levels, thus forming 16 distinct modulation states. For comparison, classical amplitude-phase modulation with 16 states includes four positive amplitude levels and four phases of the raw signal, which are multiplexed to produce the 16 states of the modulation scheme. "SNR" (signal-to-noise ratio) and "SINR" (signal-to-interference-and-noise ratio) are used interchangeably unless specifically indicated. "RRC" (radio resource control) is a control-type message from a base station to a user device. "Digitization" refers to repeatedly measuring a waveform using, for example, a fast ADC (analog-to-digital converter) or the like. An "RF mixer" is a device for multiplying an incoming signal with a local oscillator signal, thereby selecting one component of the incoming signal.

In addition to the 3GPP terms, the following terms are defined herein. Although in references a modulated resource element of a message may be referred to as a "symbol", this may be confused with the same term for a time interval ("symbol-time"), among other things. Therefore, each modulated resource element of a message is referred to as a "modulated message resource element", or more simply as a "message element", in examples below. A "demodulation reference" is a set of Nref modulated "reference resource elements" or "reference elements" modulated according to the modulation scheme of the message and configured to exhibit levels of the modulation scheme (as opposed to conveying data). Thus integer Nref is the number of reference resource elements in the demodulation reference. A "calibration set" is one or more amplitude values and/or phase values, which have been determined according to a demodulation reference, representing the predetermined modulation levels of a modulation scheme. A "short-form" demodulation reference is a demodulation reference that exhibits the maximum and minimum amplitude levels of the modulation scheme, from which the receiver can determine any intermediate levels by interpolation. "RF" or radio-frequency refers to electromagnetic waves in the MHz (megahertz) or GHz (gigahertz) frequency ranges. The "raw" signal is the as-received waveform before separation of the quadrature branch signals. "Phase noise" is random noise or time jitter that alters the phase of a received waveform, usually without significantly affecting the overall amplitude. "Phase-noise tolerance" is a measure of how much phase alteration can be imposed on a message element without causing a demodulation fault. "Amplitude noise" includes any noise or interference that primarily affects the amplitude of a received waveform. Interference due to competing signals is treated as noise herein, unless otherwise specified. A "faulted" message has at least one incorrectly demodulated message element. A "phase fault" is a message element demodulated as a state differing in phase from the intended modulation state, whereas an "amplitude fault" is a message element demodulated as a state differing in amplitude from the intended modulation state.

Referring to quadrature or PAM or QAM modulation, an "I-Q" space is an abstract two-dimensional space defined by an I-branch amplitude and an orthogonal Q-branch amplitude, in which each transmitted message element occupies one of several predetermined I-Q states of a modulation scheme. When the orthogonal branches are called "real" and "imaginary", the I-Q space is sometimes called the "complex plane". The receiver may process the received signals by determining a "sum-signal", which is the vector sum of the I and Q branch signals. A vector sum is a sum of two vectors, which in this case represent the amplitudes and phases of the two orthogonal branches in I-Q space. The sum-signal has a "sum-signal amplitude", equal to the square root of the sum of the I and Q branch amplitudes squared (the "root-sum-square" of I and Q), and a "sum-signal phase", equal to the arctangent of the ratio of the I and Q signal amplitudes (plus an optional base phase, ignored herein). Thus the sum-signal represents the raw received waveform, aside from signal processing errors which are generally negligible and are ignored herein.

When the message element is received at a receiver, the I and Q amplitudes may be substantially different from the transmitted values due to phase noise and amplitude noise, which distort the I and Q amplitudes in complex ways. The sum-signal, on the other hand, is generally affected by amplitude noise and phase noise separately, and in a direct way. Hence, modulating according to the sum-signal amplitude and sum-signal phase enables effective mitigation of both amplitude noise and phase noise, whereas modulating according to QAM branches does not. (This assumes the amplitude noise and phase noise affect the message element in the same was as a proximate demodulation reference, as disclosed below.) In addition, sum-signal demodulation enables fault diagnostics which reveal the sources of message faults. In addition, sum-signal modulation can combat particular types of noise using non-square or asymmetric modulation tables, which QAM cannot.

Most of the examples are presented using 16QAM and the corresponding 16-state sum-signal amplitude-phase modulation states; however, the principles apply equally to higher-order modulation schemes with straightforward modifications.

Turning now to the figures, a prior-art modulation scheme is susceptible to phase noise at high frequencies.

FIG. 1A is a schematic showing an exemplary embodiment of a 16QAM constellation chart, according to some embodiments. As depicted in this non-limiting example, a modulation scheme 101 includes 16 allowed modulation states 102, each allowed state determined by an I-branch signal and a Q-branch signal orthogonal to the I-branch signal (for example, the Q-branch phase-modulated at 90 degrees relative to the I-branch). The horizontal axis shows the amplitude modulation of the I-branch signal, and the vertical axis shows the amplitude modulation of the Q-branch signal, each branch being amplitude-modulated at one of certain predetermined branch amplitude levels of the modulation scheme. In this case, the predetermined branch amplitude levels are −3, −1, +1, and +3 arbitrary units. For example, the distance 103 may be 1 unit, and the distance 104 may be 3 units. The various branch amplitude levels are equally separated and symmetrical around zero. The central cross-shape represents zero branch amplitude. Negative branch amplitude levels are equivalent to a 180-degree phase change of the branch. There are 16 states, as expected for 16QAM. A receiver can receive a message element modulated according to this modulation scheme, and can extract the I and Q branches separately by analog or digital signal-processing means. The receiver can then measure the branch amplitudes of those two branches, compare the measured branch amplitude values to a predetermined set of branch amplitude levels, select the closest match to each branch amplitude, and thereby determine the modulation state of the message element. 16QAM encodes 4 bits per message element.

Also shown are the corresponding sum-signal amplitude 105 and sum-signal phase 106 of a particular state 107. The sum-signal amplitude 105 is the radius of the state 107 from the origin, and the sum-signal phase 106 is the angle relative to the horizontal axis (ignoring carrier suppression, etc.). Thus each state 102 can be described in terms of the I and Q branch amplitudes, or by the sum-signal amplitude and phase.

Figure 1B:
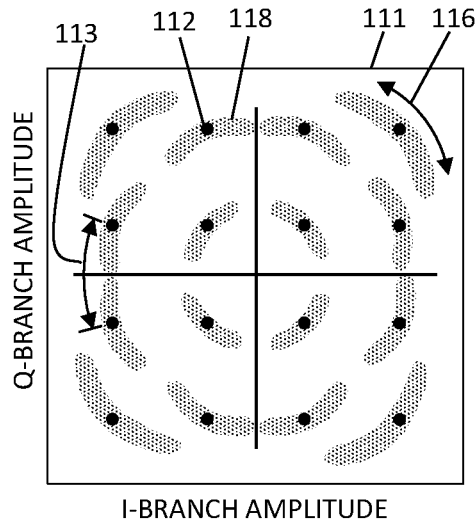
FIG. 1B is a schematic showing an exemplary embodiment of the effect of phase noise on a 16QAM constellation chart, according to some embodiments.

FIG. 1B is a schematic showing an exemplary embodiment of the effect of phase noise on a 16QAM constellation chart, according to some embodiments. As depicted in this non-limiting example, the modulation states 112 of a 16QAM constellation chart 111 can be distorted ("smeared out") by phase noise in a characteristic way as indicated by phase distortion clouds 118. The depicted distortions would be caused by moderate phase noise at moderate frequencies; at high frequencies it is much worse. If the same modulation scheme were attempted at the much higher frequencies planned for future wireless operation, the increased phase noise would cause the phase-noise clouds to overlap, resulting in frequent message faults. Hence the need for strategies to enable communication despite strong phase distortions.

Also shown are arrows qualitatively indicating the effects of noise. An arc arrow 116 shows how phase noise alters the I and Q branch amplitudes. A particular pair of 16QAM states, indicated by arrow 113, are separated by only 37 degrees of phase. Such pairs of states, that sit relatively close together in phase, determine the limiting phase noise tolerance of 16QAM, because a relatively small phase rotation angle can cause those two states to mimic each other, causing message faults.

Figure 2A:
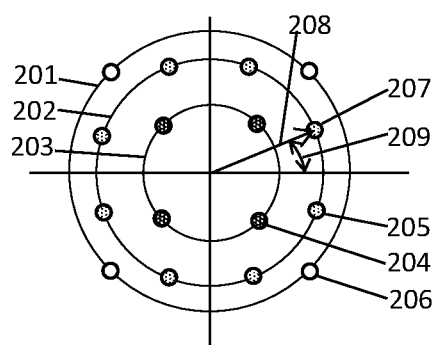
FIG. 2A is a polar plot showing an exemplary embodiment of sum-signal amplitudes and phases in 16QAM, according to some embodiments.

FIG. 2A is a polar plot showing an exemplary embodiment of sum-signal amplitudes and phases in 16QAM, according to some embodiments. As depicted in this non-limiting example, the states of 16QAM are shaded according to the corresponding sum-signal amplitude. The lowest sum-signal amplitude is shown as a circle 203 and the four states with that sum-signal amplitude are shown as dark gray dots 204. The four states with the largest sum-signal amplitude are shown as white dots 206 on the large circle 201. The eight states with the intermediate sum-signal amplitude are shown light gray 205 on the middle circle 202. It is noteworthy that all eight intermediate states have the same sum-signal amplitude, and therefore differ only in their phase.

Also shown is an arrow 208 indicating the sum-signal amplitude of a particular state 207, and an arc 209 indicating the sum-signal phase of the state 207.

The I and Q branch amplitudes are related to the sum-signal phase and amplitude according to mathematical formulas. The sum-signal amplitude 208 equals the square root of the sum of the squares of the I and Q branch amplitudes (that is, the "root-sum-square" of I and Q), while the sum-signal phase 209 equals the arctangent of the Q branch amplitude divided by the I branch amplitude. Likewise, the I branch amplitude equals the sum-signal amplitude 208 times the cosine of the sum-signal phase 209, and the Q branch amplitude equals the sum-signal amplitude 208 times the sine of the sum-signal phase 209. Conversion between the quadrature parameters and the sum-signal parameters is thus straightforward.

Although the branch amplitudes are modulated with four branch amplitude levels in 16QAM, the actual transmitted waveform has only three distinct amplitudes, as shown by the three circles 201, 202, 203. This is because eight of the 16QAM states have the same overall amplitude, which in the example is 3.16 arbitrary units (that is, $\sqrt{(3^2+1^2)}$ in this case). The three amplitude values of the transmitted waveforms are not equally spaced, as shown by the three circles 201, 202, 203 having non-equally-spaced radii (specifically 1.41, 3.16, and 4.24 arbitrary units in this case). Thus, although the branch amplitudes are modulated according to four amplitude levels, the transmitted and received wave has only three distinct amplitude levels, in 16QAM. The unequal spacing of the overall waveform amplitudes can limit the amplitude noise immunity, as described below.

Figure 2B:
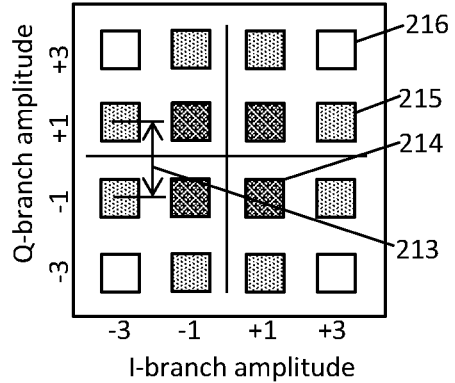
FIG. 2B is a schematic showing an exemplary embodiment of a constellation chart with states shaded to indicate the sum-signal amplitude, according to some embodiments.

FIG. 2B is a schematic showing an exemplary embodiment of a constellation chart with states shaded to indicate the sum-signal amplitude, according to some embodiments. As depicted in this non-limiting example, the modulation states of 16QAM are again depicted as a constellation table, with the I-branch amplitude horizontally and the Q-branch amplitude vertically. The scales are in arbitrary units. The states are shaded in the same way as the dots of FIG. 2A, white for the largest-amplitude sum-signal states 216, light gray for the intermediate states 215, and dark gray for the smallest sum-signal amplitudes 214. Also shown is a phase separation 213 between two of the states, which corresponds to the same dimension 113 between the same two states in FIG. 1B. As mentioned, the phase separation is only 37 degrees, which limits the phase noise tolerance in 16QAM and similar modulation schemes.

Figure 3A:
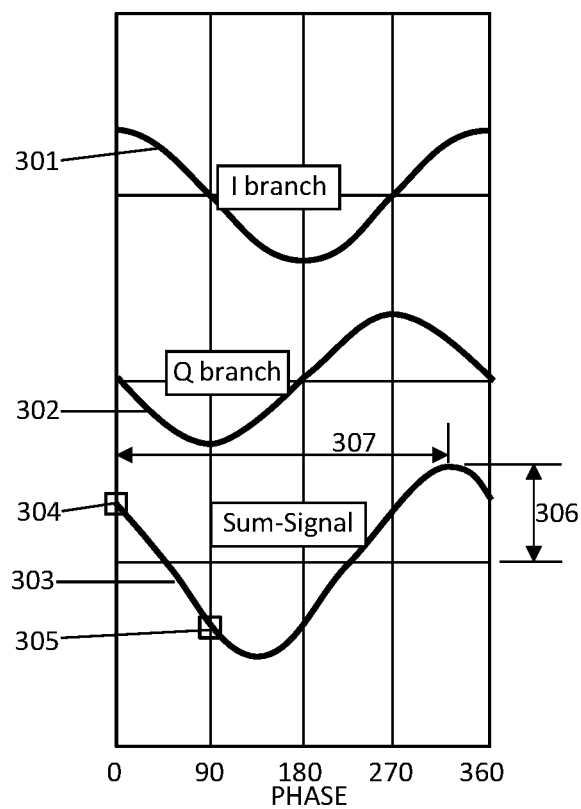
FIG. 3A is a sketch showing an exemplary embodiment of waveforms of QAM branches and a sum-signal, according to some embodiments.

FIG. 3A is a sketch showing an exemplary embodiment of waveforms of QAM branches and a sum-signal, according to some embodiments. As depicted in this non-limiting example, the waveform of an I-branch signal 301 and a Q-branch signal 302 are shown versus phase (or equivalently, versus time). Also shown is the sum-signal 303 formed by adding the two branch amplitudes 301, 302 together. The sum-signal 303 is the waveform that is actually transmitted by a transmitter and received by the antenna of a receiver, before separation of the branches 301, 302 by electronics. The transmitter does not transmit the I and Q branches 301, 302 explicitly; it transmits the sum-signal 303. The sum-signal 303 has a (zero-to-peak) amplitude 306 and a (crest) phase 307 as shown. When a receiver separates the two branch signals, the I-branch amplitude is equivalent to the sum-signal value at a phase of zero, as indicated by a first box 304 where the Q-branch signal passes through zero. Likewise the Q-branch amplitude is equivalent to the sum-signal value at 90 degrees as indicated by a second box 305, which is where the I-branch waveform passes through zero. In this case, the boxes 304, 305 indicate that the I-branch amplitude is positive and the Q-branch amplitude is negative, as indicated by the boxes 304, 305 being positive and negative in amplitude. Accordingly, the I-branch waveform 301 shows a maximally positive value at zero degrees, while the Q-branch waveform 302 shows a maximally negative value at 90 degrees. The sum-signal 303 is the sum of the branch waveforms 301, 302 and the sum-signal amplitude and phase 306, 307 are related by trigonometric formulas to the I and Q branch amplitudes, as mentioned. In this specific case, the sum-signal amplitude 306 is $\sqrt{2}$ times the amplitude of the I and Q branches 301, 302 and the sum-signal phase 307 is 315 degrees as shown.

Figure 3B:
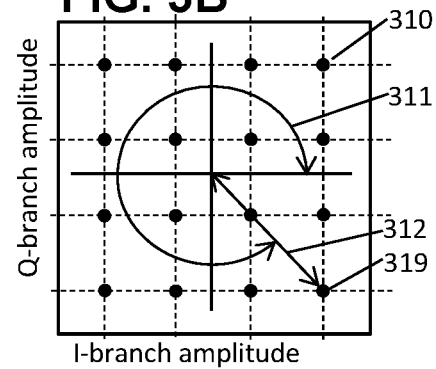
FIG. 3B is a constellation chart showing an exemplary embodiment of QAM and sum-signal parameters, according to some embodiments.

FIG. 3B is a constellation chart showing an exemplary embodiment of 16QAM and the corresponding sum-signal parameters, according to some embodiments. As depicted in this non-limiting example, the modulation states 310 of 16QAM are shown as dots versus the I and Q branch amplitudes, with zero amplitude at the center. A particular state 319 is shown with a sum-signal amplitude 312 and a sum-signal phase 311 as indicated by arrows. That state 319 has the maximally positive I amplitude, maximally negative Q amplitude, and a sum-signal phase of 315 degrees. This state 319 corresponds to the sum-signal waveform 303, of FIG. 3A.

Figure 3C:
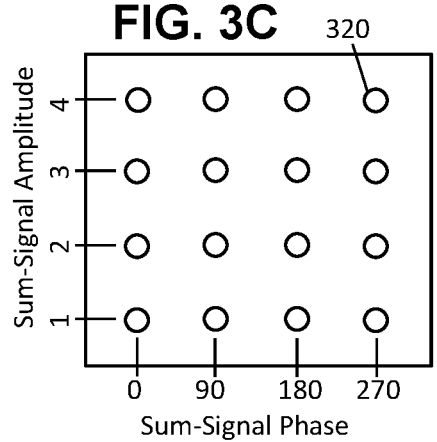
FIG. 3C is a chart showing an exemplary embodiment of a sum-signal modulation table, according to some embodiments.

FIG. 3C is an exemplary embodiment of a sum-signal modulation table, according to some embodiments. As depicted in this non-limiting example, little circles 320 represent the modulation states of a sum-signal amplitude-phase modulation scheme with 16 states. Although the layout appears similar to the constellation chart of 16QAM, the meaning is quite different. The modulation table of FIG. 3C shows the sum-signal phase on the horizontal axis and the sum-signal amplitude vertically. The sum-signal amplitude levels are equally spaced at 1 unit, and the sum-signal phase levels are equally-spaced by 90 degrees. Since phase is a circular parameter, the phase separation between the first and last column is also 90 degrees, although this type of chart does not make that obvious.

There are 16 states with sum-signal amplitude and phase modulation, thereby encoding 4 bits per message element. Hence, messages are the same length whether modulated in 16QAM or sum-signal amplitude-phase modulation. The difference between these modulation schemes, however, is in noise sensitivity. For example, the phase separation between sum-signal states is a uniform 90 degrees, whereas the closest 16QAM phase separation is 37 degrees. In addition, the four sum-signal amplitude levels are equally spaced apart, whereas the three overall amplitude levels of 16QAM are not equally spaced, as mentioned.

Figure 3D:
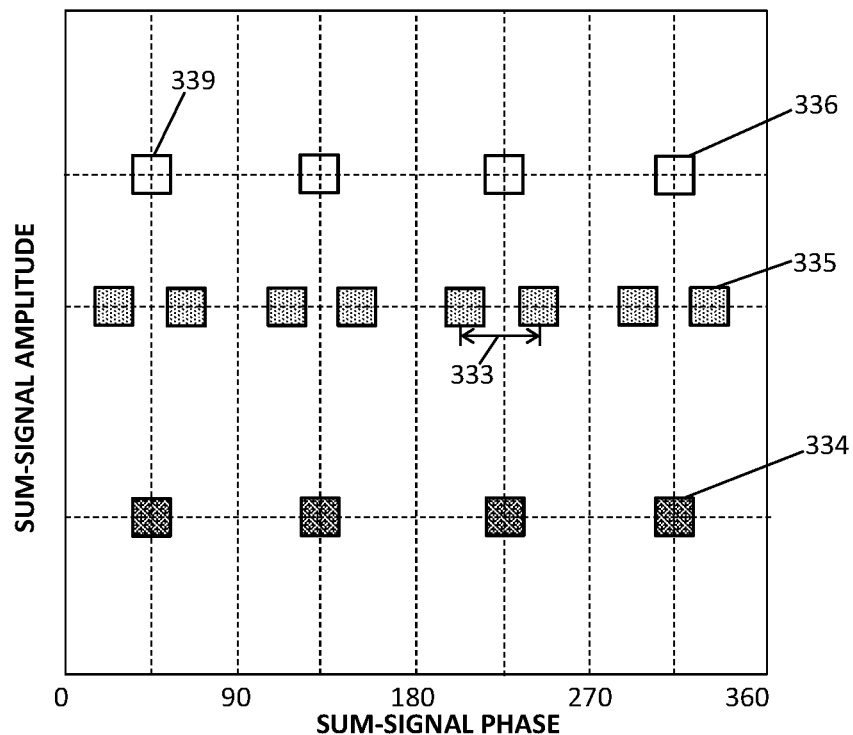
FIG. 3D is a chart showing an exemplary embodiment of the sum-signal amplitudes and phases of 16QAM states, according to some embodiments.

FIG. 3D is a chart showing an exemplary embodiment of the sum-signal amplitudes and phases of 16QAM states, according to some embodiments. As depicted in this non-limiting example, the states of 16QAM are shown plotted against the sum-signal amplitude and sum-signal phase of each state. When a message element is modulated in 16QAM, the actual transmitted waveform has the overall amplitude and phase values shown in this chart, and the receiver receives the overall waveform with these amplitude and phase values (absent noise) before the I and Q branches are extracted.

The sum-signal states with the largest amplitude are shown as four white squares 336, corresponding to the "corner" squares in a QAM constellation chart, such as the white squares 216 in FIG. 2B or the white dots 206 in FIG. 2A. The four dark squares 334 are the smallest amplitude states, corresponding to the dark squares and circles 204 and 214 in FIGS. 2A and 2B. The eight gray squares 335 are the intermediate-amplitude states corresponding to the gray states 215 and 225 in FIGS. 2A and 2B. A particular state 339 has the highest sum-signal amplitude and a sum-signal phase of 45 degrees, and thus corresponds to the state 310 in FIG. 3B. Likewise, the state 336 in this chart corresponds to 319 in FIG. 3B, and to 303 in FIG. 3A.

Also shown is a phase separation 333 between two of the intermediate-amplitude states 335. This phase separation 333 corresponds to the same dimension labeled as 213 in FIG. 2B. As can be seen in the chart, the intermediate-amplitude states 335 of 16QAM are clustered together in pairs, separated by only 37 degrees of phase. In addition, the amplitude separations are unequal (corresponding to 1.08 and 2.02 arbitrary units in this case). The problem is that at high frequencies, the phase noise tends to dominate over amplitude noise, and therefore the phase clustering of QAM states leads to excessive phase noise faulting. At high frequencies, the clustering of QAM states in phase, and spreading in amplitude, is the exact opposite of what may be desired for reliable messaging at high frequencies. Instead, a better modulation scheme for high frequencies may have equal large phase separation between states for phase-noise immunity, and additional amplitude levels for high throughput.

For example, FIG. 3C shows that the sum-signal modulation scheme has the desired properties. The sum-signal phase levels are all separated by a full 90 degrees as desired, thereby providing over 2.4 times larger phase noise tolerance than 16QAM. In addition, there are four sum-signal amplitude levels instead of three overall amplitudes of 16QAM, and they are equally spaced when modulated according to the sum-signal amplitude and phase instead of modulating by branch amplitudes. Noise attacks the overall received waveform, not the individual branches, and hence the close phase separation between adjoining states in 16QAM leads to unwanted phase faults. For these reasons, the sum-signal modulation scheme may be better suited to high-frequency messaging than QAM, especially when high throughput is needed and phase noise is limiting.

Figure 4:
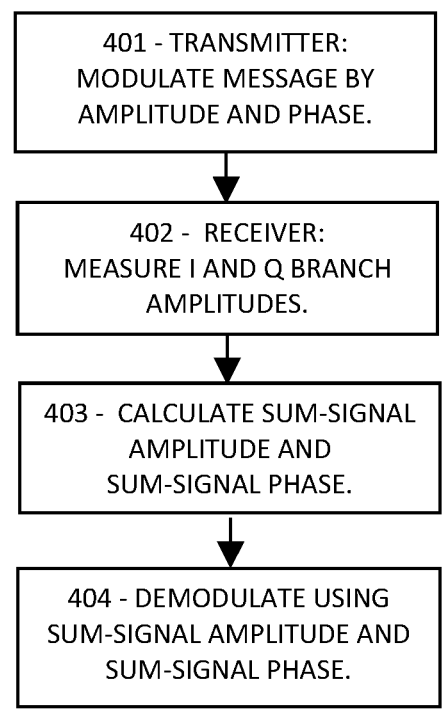
FIG. 4 is an flowchart showing an exemplary embodiment of a method to receive a message using quadrature components, and demodulate the message using the sum-signal amplitude and phase, according to some embodiments.

FIG. 4 is an flowchart showing an exemplary embodiment of a method to receive a message using quadrature components, and demodulate the message using the sum-signal amplitude and phase, according to some embodiments. As depicted in this non-limiting example, a message is modulated, by the transmitter, in equally-spaced sum-signal amplitudes and phases, but is processed as quadrature branch signals by the receiver. The receiver then calculates the received sum-signal amplitude and phase, and demodulates the message according to predetermined sum-signal amplitude levels and sum-signal phase levels. This method can provide improved phase noise tolerance because the phase separation of the sum-signal states is larger than the phase separation of the quadrature-modulated states.

At 401, a transmitter modulates a message element of a message according to predetermined sum-signal amplitude levels and sum-signal phase levels of a sum-signal modulation scheme such as that of FIG. 3C. The transmitter then transmits the message element as a sinusoidal waveform having the sum-signal amplitude and the sum-signal phase. At 402, the receiver receives the waveform and separates the two orthogonal I and Q components or branches. The receiver then processes (amplifies, filters, digitizes, etc.) the I and Q branch signals, and then measures the I and Q branch amplitudes according to the digitized data.

At 403 the receiver calculates the sum-signal amplitude and sum-signal phase of the message element, based on the measured I and Q branch amplitudes. At 404, the receiver compares the calculated sum-signal amplitude and sum-signal phase to a set of predetermined amplitude levels and phase levels of the sum-signal modulation scheme, and thereby demodulates the message. (Amplitude noise and phase noise are zero in this example, but are treated in subsequent examples.)

The receiver uses quadrature branch separation for signal processing because it is much cheaper and easier to process the incoming signal as two orthogonal components than to process the received waveform itself. Typically the receiver electronics include a high-frequency amplifier close to the antenna, followed by two parallel subsystems that separately extract the I and Q branch signals. The receiver then performs frequency downconversion, filtering, and digitization (among other tasks) by operating on the two branch signals separately. The receiver can then separate each subcarrier signal according to frequency, and thereby determine the I and Q branch amplitudes of each message element from the digitized data.

The receiver can then demodulate the message element using sum-signal amplitude and phase, instead of the quadrature amplitudes, to obtain the advantageous noise margins. After measuring the I and Q branch amplitudes, the receiver can then calculate the sum-signal amplitude and sum-signal phase, using the formulas discussed above, for example. The resulting sum-signal corresponds closely to the originally modulated waveform at the transmitter (aside from noise, excluded in this case). The receiver can then compare the sum-signal amplitude and phase to the predetermined sum-signal amplitude and phase levels of the modulation scheme, as indicated by a demodulation reference proximate to the message. For example, the receiver can select the closest match, for each message element's sum-signal amplitude and phase, among the predetermined sum-signal amplitude and phase levels of the modulation scheme. The receiver can thereby demodulate the message element while preserving the wide phase-noise margins provided by sum-signal modulation and demodulation, while continuing to use the convenient branch-separation receiver electronics for raw signal processing in quadrature.

The sum-signal modulation method differs from prior-art 16QAM in that (a) the message element is modulated, at the transmitter, according to sum-signal amplitudes and phases instead of I and Q branch amplitudes, and (b) the receiver converts the received I and Q branch amplitudes back to sum-signal amplitudes and phases before demodulation. The intermediate steps (processing two quadrature signals in the receiver) are the same as with QAM. The average transmitter power is the same as that of QAM since the maximum and minimum transmitted levels are unchanged. The message length and resource usage are the same as with QAM because they both provide the same number of bits per message element (that is, 4 bits in the examples shown). The difference, however, is that with sum-signal modulation, the phase noise margin has been raised to 90 degrees (full width), instead of 37 degrees as in 16QAM, thereby greatly reducing the incidence of phase faults. In addition, there are four equally-spaced amplitudes when modulated according to the sum-signal waveform, as opposed to just three waveform amplitude levels, not equally spaced, with 16QAM. The extra sum-signal amplitude level, and their equal spacing, can provide higher throughput while avoiding amplitude faults, according to some embodiments.

For these reasons and those presented below, sum-signal modulation may be offered as an advantageous noise-tolerant modulation scheme, especially for high-frequency wireless communication.

The following examples show how sum-signal modulation can mitigate amplitude and phase noise.

FIG. 5A is an exemplary embodiment of a sum-signal modulation table, according to some embodiments. As depicted in this non-limiting example, the sum-signal modulation table 501 is again shown, with states 502 arranged according to sum-signal amplitude multiplexed with sum-signal phase. The amplitude separation 503 is uniform at one arbitrary unit and the phase separation 504 is uniform at 90 degrees, for the case of a 16-state modulation scheme. In the absence of noise, the receiver (after signal processing as described in the previous figure) determines a sum-signal amplitude and phase for each message element, according to this chart. The following figure shows how the received sum-signal can be distorted by phase noise.

FIG. 5B is an exemplary embodiment of a sum-signal modulation table including phase noise, according to some embodiments. As depicted in this non-limiting example, the sum-signal states 512 are displaced by a phase rotation angle 511 to the new positions 513 shown as circles. Most sources of phase noise (such as clock jitter, for example) affect the system time-base, not the individual modulation states separately. Therefore, all of the states are displaced by the same amount 511, and in the same direction, by phase noise in general. A message element, modulated according to the sum-signal scheme, is displaced by phase noise by the same amount regardless of which modulation state is used for the particular message element. In contrast, the I and Q branch amplitudes of QAM are mixed together by phase noise, and the mixing is by different amounts at various regions of the constellation chart, greatly complicating phase noise mitigation.

Using sum-signal modulation, the receiver can mitigate phase noise by simply subtracting the phase rotation angle from the received sum-signal phase of the received message element, regardless of the modulation state. For example, the receiver can measure the phase rotation angle 511 according to a demodulation reference proximate to the message element (preferably in the same symbol-time, and more preferably in the same OFDM symbol, as the message element), and then subtract the phase rotation angle from the sum-signal phase, thereby obtaining a corrected sum-signal phase with the phase noise largely negated.

In another embodiment, the receiver can add the phase rotation angle to the predetermined sum-signal phase levels of the modulation scheme, and then compare the received sum-signal phases to the corrected sum-signal phase levels. It is immaterial whether the receiver adjusts the received phases or the calibration phase levels, so long as the phase noise effect is negated in the comparison.

FIG. 5C is an exemplary embodiment of a sum-signal modulation table including amplitude noise, according to some embodiments. As depicted in this non-limiting example, the sum-signal states 522 are displaced by an additive amplitude adjustment 521 to the new positions 523 shown as circles. Here the amplitude noise is assumed to be due to interference from a signal which is synchronous, or almost synchronous, with the sum-signal, such as a transmission from a neighboring cell. The states 522 are then increased in amplitude by the amount of amplitude noise if the states and the noise have the same overall phase, in which case the wave interference is called constructive interference. For other modulation states that have the opposite phase, the interference is destructive, in which case the sum-signal amplitude of the message element is reduced by the amplitude noise. The intermediate states, which are phased at degrees relative to the amplitude noise, are largely unaffected, aside from a slight interference phase shift which is ignored in this example.

The receiver can measure the amplitude noise by measuring a demodulation reference proximate to the message element, compared to an expected amplitude. Alternatively, the receiver can measure the unexpected signal received in a blank resource element, with no transmission. In either case, the receiver can add or subtract the amplitude adjustment to/from the received sum-signal amplitude, the sign depending on the relative phase between the interference and the sum-signal. If the interference and the sum-signal have the same phase, the effect is additive. If they have opposite phase, it is subtractive. In general, the corrected sum-signal amplitude equals the received sum-signal amplitude minus a correction, wherein the correction equals the amplitude adjustment value from the noise, times the cosine of the phase difference between the noise and the sum-signal. In the example, the receiver can calculate an amplitude adjustment 521 as shown, and then add or subtract the amplitude adjustment 521 to or from the appropriate phase states 512 according to the relative phase of the interference, thereby obtaining a corrected sum-signal amplitude with the amplitude noise largely negated.

According to the noise mitigation examples of the last two figures, the receiver can detect, measure, and largely negate both phase noise and amplitude noise in message elements according to a proximate demodulation reference, by simply adding or subtracting each noise type from the associated states of the received sum-signal waveform. As an alternative, the receiver can leave the sum-signal amplitude and phase unchanged, and adjust the predetermined amplitude and phase levels instead, and then compare the received sum-signal amplitude and phase to those adjusted levels. The demodulation would be the same regardless of whether the received parameters or the predetermined levels are adjusted to mitigate the noise. Because the amplitude level adjustment depends on the relative phase of the noise and the message sum-signal, it may be simpler to keep the predetermined levels constant and correct the received sum-signal amplitude and phase as described.

FIG. 5D is a flowchart showing an exemplary embodiment of a method to mitigate amplitude noise and phase noise in sum-signals, according to some embodiments. As depicted in this non-limiting example, at 551 a receiver determines an amplitude adjustment value and a phase rotation angle, by determining how a demodulation reference deviates from the predetermined amplitude and phase levels of the modulation scheme. At 552 the receiver mitigates phase noise by subtracting the phase rotation angle from the received sum-signal phase of the message element. The receiver can also mitigate the sum-signal amplitude by adding or subtracting the amplitude adjustment from the received sum-signal amplitudes, with the sign depending on the sum-signal phase, as described. Thus the receiver can obtain a corrected message sum-signal amplitude and a corrected message sum-signal phase, for subsequent demodulation with the noise mitigated.

In some embodiments, the phase noise mitigation is applied by adjusting the predetermined phase levels of the modulation scheme according to the phase measurement of the most recent demodulation reference, and then demodulating the received sum-signal phase according to those phase-shifted predetermined phase levels. It is immaterial whether the phase mitigation is applied to the sum-signal phases as depicted, or to the predetermined phase levels, since the resulting demodulation is the same.

In some embodiments, the receiver can measure an amplitude of a demodulation reference and interpret this as an overall gain shift or a change in propagation attenuation, and then scale all of the predetermined amplitude levels of the modulation scheme proportionally. However, such changes in overall amplitude are generally infrequent; most amplitude effects are due to transient coherent signals. Therefore, preferably, the receiver may apply such adjustments to the predetermined amplitude levels only after determining that the amplitude effects are due to a gain drift or propagation effect, and not due to episodic interference.

In some embodiments, the demodulation reference, or the message itself, can include a blank resource element with no transmission. The receiver can determine the interference signal directly, by measuring the sum-signal amplitude and phase received during that blank resource element. The receiver can then use the sum-signal amplitude and phase values of the blank resource element to calculate the amplitude adjustment, and can proceed with the amplitude mitigation as described. One example of a demodulation reference includes two resource elements; one with a predetermined transmission signal and the other with no transmission. Then the receiver can measure the resource element modulated according to a predetermined sum-signal amplitude and sum-signal phase, and thereby determine the phase rotation angle according to the received phase of the sum-signal in that transmitted resource element. The receiver can then measure noise signals in the blank resource element, which reveals the sum-signal amplitude and sum-signal phase coming from the interference alone. The demodulation reference can thereby enable both amplitude and phase noise mitigation at the same time, consuming just two resource elements.

Figure 6:
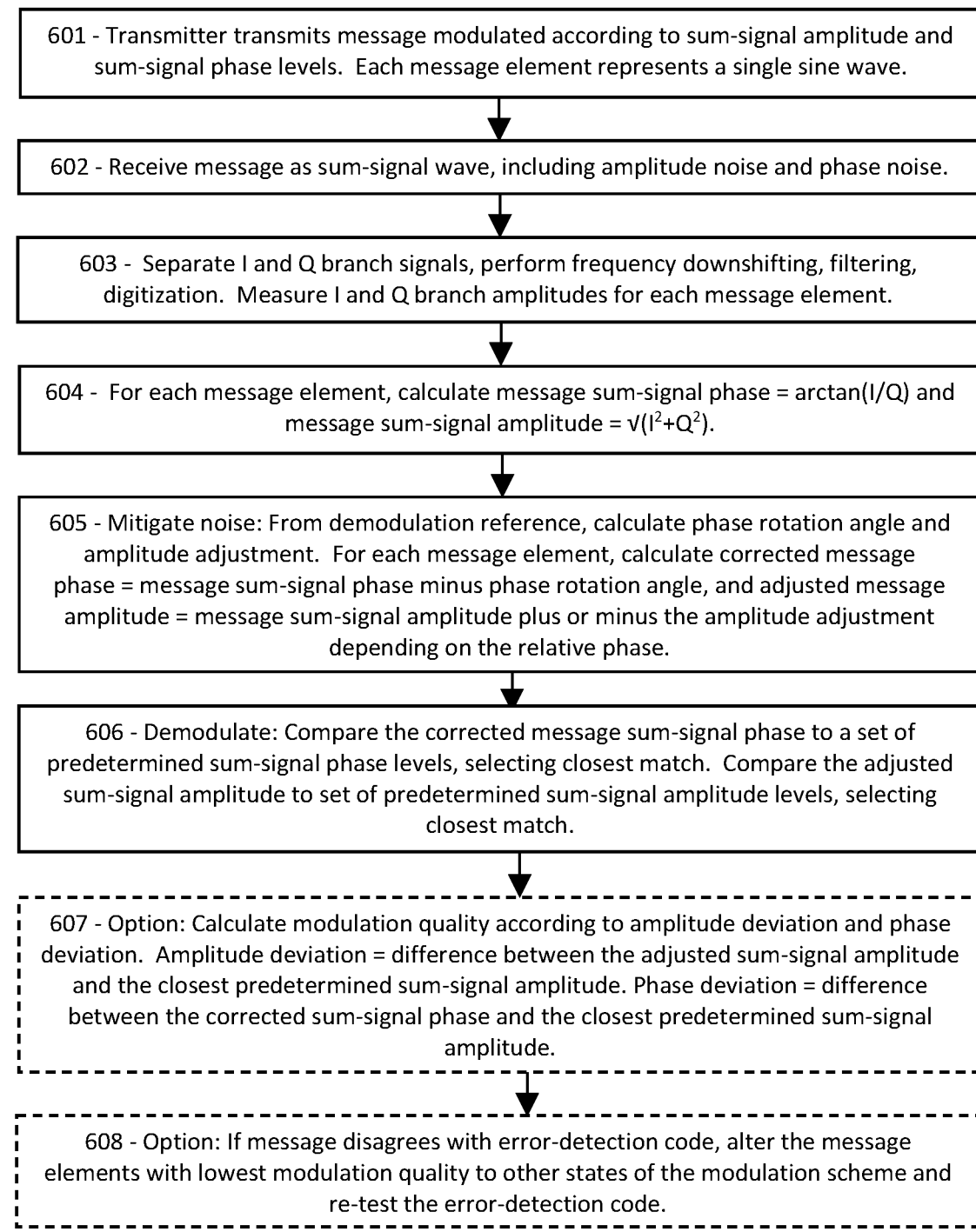
FIG. 6 is a flowchart showing an exemplary embodiment of a procedure for transmitting and receiving a message and using sum-signal demodulation to mitigate amplitude noise and phase noise, according to some embodiments.

FIG. 6 is a flowchart showing an exemplary embodiment of a procedure for transmitting and receiving a message, while using sum-signal demodulation to mitigate amplitude noise and phase noise, according to some embodiments. As depicted in this non-limiting example, a communication method for noise mitigation is described. At 601, a transmitter modulates a message of message elements, each message element modulated according to a modulation scheme, each state of the modulation scheme having multiplexed amplitude modulation and phase modulation. Hence the transmitted waveform has a transmitted amplitude and a transmitted phase according to the predetermined levels of the modulation scheme. In addition, as is normally the case, the transmitter transmits the message as an OFDM symbol that includes multiple message elements, simultaneously transmitted at the same symbol-time, with each message element occupying one subcarrier. Thus the transmitted waveform is the sum of the various subcarrier waves, each at a slightly different frequency.

At 602, a receiver receives the compound waveform including all the message element signals overlapping, each message element with its own sum-signal amplitude and sum-signal phase, at its own subcarrier frequency. The receiver amplifies the antenna signal for further signal processing. At 603, the receiver separates the received waveform into I and Q quadrature components. The receiver usually downshifts the frequency coherently, and does other steps, before digitizing the two branch components separately, for example using a pair of fast analog-to-digital converters. The receiver can then measure the I and Q branch amplitudes of the digitized signal in each subcarrier, for example by digital filtering and other means, thereby determining the branch amplitudes of the message element.

At 604, the receiver can convert the I and Q branch amplitudes to the corresponding received sum-signal phase and sum-signal amplitude of each message element. For example, the receiver can calculate the message sum-signal amplitude as the square root of the sum of the I and Q branch amplitudes squared, and the sum-signal phase as the arctangent of the Q amplitude divided by the I amplitude.

Optionally, at 605, the receiver can mitigate noise by receiving a demodulation reference (which may be proximate to or simultaneous with the message) and determining, from the sum-signal amplitude and sum-signal phase of the demodulation reference, a phase rotation angle and an amplitude adjustment value. For example, the receiver can measure the I and Q branch amplitudes of the demodulation reference, calculate the sum-signal amplitude and phase of the demodulation reference as described above, and then compare the reference sum-signal amplitude and phase to a set of previously determined amplitude levels and phase levels. For example, the receiver can determine the phase rotation angle by subtracting the predetermined sum-signal phase from the received sum-signal phase of the demodulation reference, and can also determine the amplitude adjustment by subtracting the predetermined sum-signal amplitude from the received sum-signal amplitude of the demodulation reference. Then the receiver can then mitigate the noise by subtracting the phase rotation angle from the sum-signal phase of the message element, obtaining a phase-corrected sum-signal phase, and can add or subtract the amplitude adjustment from the received sum-signal amplitude of the message element (depending on the sum-signal phase, as mentioned), thereby obtaining a noise-corrected sum-signal amplitude and phase.

At 606, the receiver can compare the corrected sum-signal amplitude and phase of the message element to a set of predetermined sum-signal amplitudes and a set of predetermined sum-signal phases, selecting the closest phase and amplitude levels, and thereby determine which modulation state is encoded in the message element, and thereby demodulate the message element's content.

As a further option, at 607, the receiver can calculate a modulation quality for each message element according to the amplitude deviation and the phase deviation. For example, the receiver can calculate the amplitude deviation as the difference between the corrected sum-signal amplitude and the closest predetermined sum-signal amplitude level of the modulation scheme. Likewise, the phase deviation is the difference between the corrected sum-signal phase and the closest predetermined phase level of the modulation scheme. If the message subsequently turns out to be corrupted, the receiver can review the message elements, select one with the lowest modulation quality (that is, the largest amplitude and/or phase deviations), and attempt to repair the fault in that message element, instead of automatically requesting a retransmission. For example, at 608 the receiver can select the message element with the lowest modulation quality, and alter the assigned amplitude or phase modulation state of the selected message element to each of the other modulation states, testing each altered version against an associated error-detection code. The receiver can thereby determine whether one of the altered messages is correct. However, if none of those alterations is correct, the receiver can request a retransmission of the message.

The example assumes that the receiver separates the incoming waveform into I and Q orthogonal branches for subsequent signal processing. However, in some embodiments, the receiver may be capable of signal processing the whole waveform as-received, instead of separating and processing the branches individually. In one embodiment, the receiver can process and digitize the whole waveform (optionally after frequency downshifting). In another embodiment, the receiver can separate the branches, but then generate a single combined digitized data stream by combining the I and Q branch signals, instead of preparing two separate digitized data streams. In each case, and other like embodiments, the receiver can extract the message element according to its subcarrier frequency from the combined data set, and can determine the sum-signal amplitude and sum-signal phase directly from the digitized data instead of calculating the sum-signal parameters from the I and Q amplitudes. Many other signal-processing options are possible. It is immaterial how the receiver processes the signals, so long as the receiver performs the demodulation based on the sum-signal amplitude and phase.

Figure 7A:
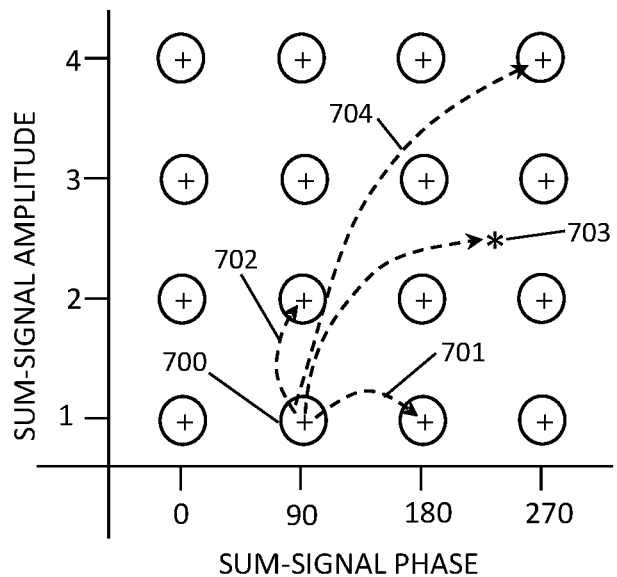
FIG. 7A is an exemplary embodiment of a sum-signal modulation table including various types of faults, according to some embodiments.

FIG. 7A is an exemplary embodiment of a sum-signal modulation table including various types of faults, according to some embodiments. As depicted in this non-limiting example, a receiver can diagnose problems by determining the types of message faults received. For example, the receiver can receive a corrupted message, as determined by disagreement with an embedded error-detection code. The receiver may succeed in repairing the corrupted first copy of the message, for example by altering the message elements starting with the worst modulation quality, and thereby determine the corrected version. Alternatively, the receiver can then request and receive a second copy, which may be uncorrupted. As a third alternative, if the copy is also corrupted, the receiver may assemble a merged message by selecting, from the corresponding message elements from the two copies, the message element with the highest modulation quality.

After determining the correct message, the receiver can then review the message elements that differ between the corrupted and corrected copies, and can thereby determine how the faulted message element was distorted. For example, the receiver can determine whether the faulted message element (or elements) differs from the corrected version in the sum-signal phase or amplitude, or both. The receiver can also determine the magnitude of the difference in phase or amplitude, to further categorize the fault type. Fault analysis can provide valuable feedback to a network, especially regarding which other modulation scheme may provide better performance in the current noise environment.

The figure shows a sum-signal modulation table with sum-signal amplitude multiplexed with sum-signal phase, and a variety of fault types by curvy dashed arrows. A particular modulation state 700 is shown, along with various fault trajectories caused by noise, distorting the original state 700 to some other part of the modulation table. For example, the state 700 can have an adjacent-phase fault 701 in which it is altered to another state that differs by one phase level only. The state 700 can be altered by an adjacent-amplitude fault 702 to another state differing by one amplitude level only. A non-adjacent fault 704 occurs when the state 700 is displaced to another state that differs by more than one amplitude level or more than one phase level or a combination of amplitude and phase levels. A non-matching fault 703 occurs when the state 700 is altered to a location (asterisk) that is so far from any of the predetermined modulation states that it cannot be demodulated.

An advantage of modulating with sum-signal parameters instead of QAM branch amplitudes may be that, with sum-signal modulation the fault analysis is clear and specific, whereas with QAM the amplitude noise and phase noise scramble the quadrature branch amplitudes in complex ways, complicating fault diagnosis.

Figure 7B:
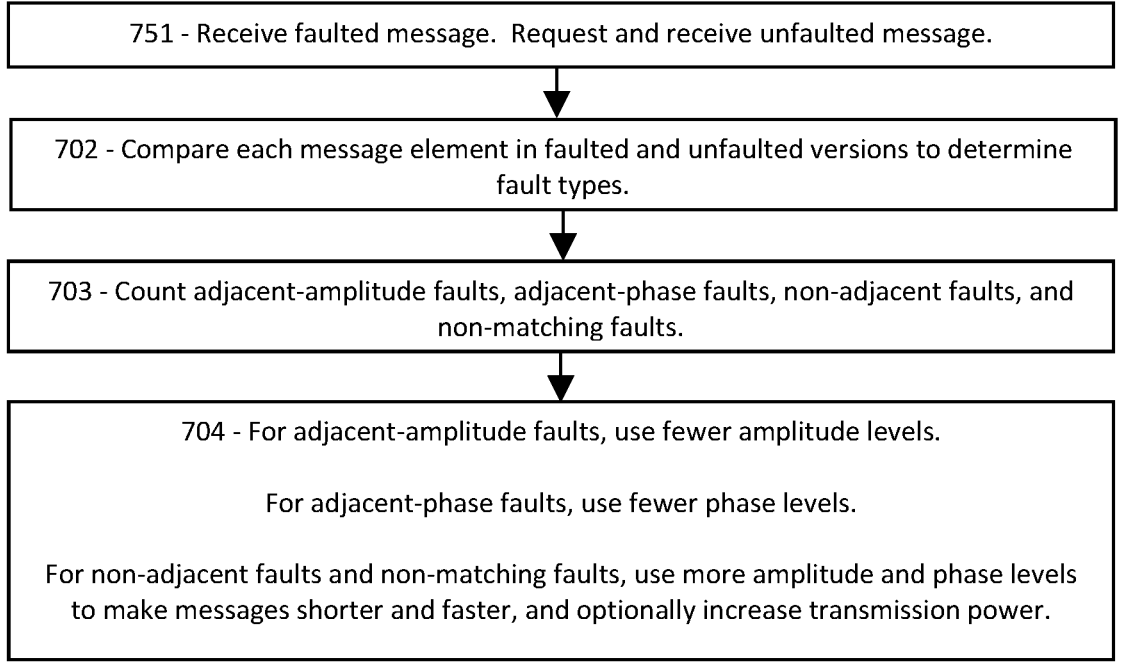
FIG. 7B is a flowchart showing an exemplary embodiment of a method to select a modulation table to mitigate various types of faults, according to some embodiments.

FIG. 7B is a flowchart showing an exemplary embodiment of a method to select a modulation table to mitigate various types of faults, according to some embodiments. As depicted in this non-limiting example, at 751 a receiver receives a corrupted message, then requests and receives an uncorrupted version of the same message. At 702, the receiver compares the message elements of the two versions, identifies one or more message elements that differ between the two versions (therefore indicating that those message elements are faulted in the first version). The receiver then determines the fault types based on the direction of the displacement (in phase or in amplitude) and the size of the displacement (adjacent or non-adjacent). Many other features are of interest, such as possible clustering of the faults in a portion of the message, the temporal distribution of faults by type to determine low-noise and high-noise intervals, frequency dependence of interference by type and magnitude, among others. At 703, the receiver counts the number of faults of each type, accumulating a tally for each fault type. The receiver can also record the timing of faults or the rate of accumulation of fault types, and thereby identify specific times when faults may be driven by bursty interference, for example.

At 704, the receiver (or other entity such as a core network) can analyze the accumulated fault data and determine which modulation scheme may provide better results (such as fewer faults, higher net throughput, fewer dropped calls, or other performance metric). For example, if adjacent-amplitude faults predominate, the receiver can suggest switching to a different modulation scheme with fewer amplitude levels and thus wider separation between the amplitude levels. If adjacent-phase faults are common, the receiver can switch to a scheme with fewer phase levels and thus a larger phase separation. If most faults are non-adjacent or non-matching, the receiver may determine that the occasional interference appears to be too strong for such mitigations to be successful. In that case, switching to fewer amplitude or phase levels would likely be futile. Instead, the receiver can do the opposite, by increasing the number of amplitude and/or phase levels. The faults may be due to occasional strong noise such as episodic interference from another cell, in which case a better strategy may be to make the messages as short as possible, in time or bandwidth, so as to evade the noise episodes. In that case, the receiver can suggest using a modulation scheme with more sum-signal amplitude and/or phase levels, and hence a higher information content per message element, which therefore shortens the message overall. Alternatively, the receiver can recommend increasing the transmission power (although this may backfire if the interfering transmitter follows suit). As a further option, the receiver can determine, from the timing or rate of message faults, when the interference is likely to re-appear, and may then transmit the message between the instances of interference.

Figure 8:
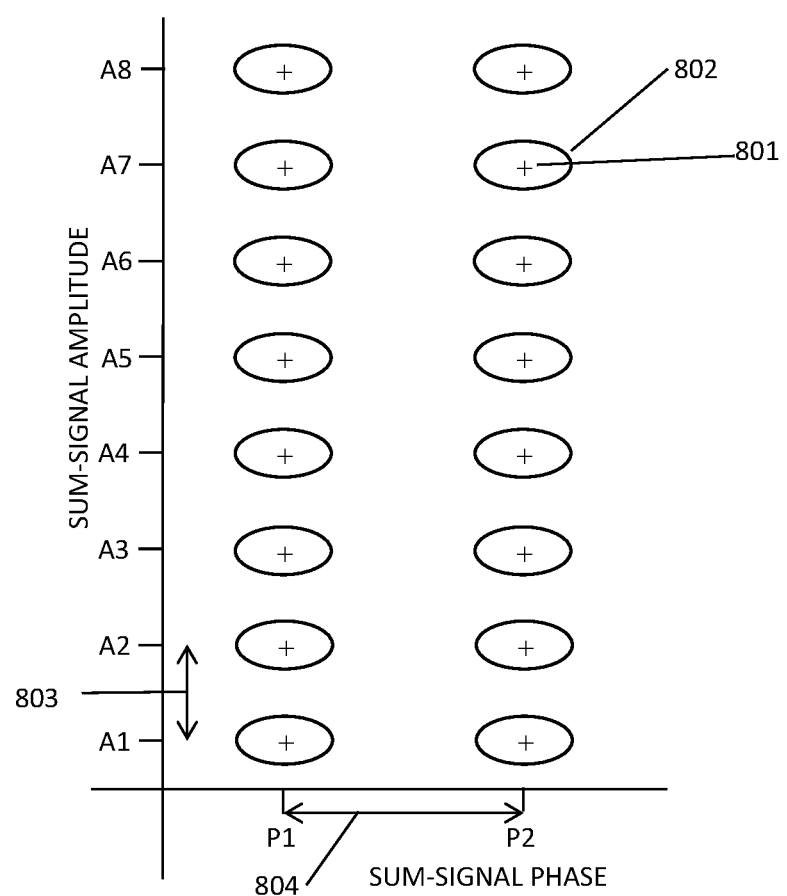
FIG. 8 is an exemplary embodiment of a sum-signal modulation table configured to mitigate phase faults, according to some embodiments.

FIG. 8 is an exemplary embodiment of a sum-signal modulation table configured to mitigate phase faults, according to some embodiments. As depicted in this non-limiting example, a sum-signal modulation scheme is shown with modulation states 801 surrounded by an acceptance zone 802, such that a received signal that has sum-signal amplitude and phase within one of the acceptance zones 802 is assigned "non-suspicious" while a modulation outside the acceptance zones 802 may be "suspicious", although it may be demodulated according to the closest state anyway. There are two phase levels (P1, P2) separated by a phase separation 804 (180 degrees in this case), multiplexed with eight amplitude levels (A1-A8) all separated by the same amplitude separation 803. The modulation scheme is non-square in that the number Nphase of phase levels is not equal to the number Namp of amplitude levels. Such a sum-signal modulation scheme may be recommended by a receiver that experiences a high rate of phase faults with 16QAM or another modulation scheme. The wide phase separation 804 of the depicted chart may avoid most phase faults. The number of states is 16, thereby keeping the information content the same (4 bits) in each message element.

An advantage of sum-signal modulation may be that it is readily adapted for asymmetric or non-square modulation tables which mitigate phase noise natively. In contrast, QAM modulation schemes are generally not well-suited to such asymmetric or non-square modulation schemes because the two branches are generally equivalent; hence, reducing either branch relative to the other would likely provide no benefit. Another advantage may be that the sum-signal amplitude and sum-signal phase are separately modulated, thereby providing additional versatility that enables the transmitter and the receiver to adapt a non-square or asymmetric scheme to the noise environment.

FIG. 9 is a schematic showing an exemplary embodiment of a message with various types of faults, according to some embodiments. As depicted in this non-limiting example, a faulted message 901 is shown as a series of modulated message elements, each message element having a sum-signal amplitude and a sum-signal phase (as in "A1-P1"). An unfaulted message 902 is also shown. The faulted message 901 includes an adjacent-amplitude fault 903, an adjacent-phase fault 904, and a non-adjacent fault 905. The adjacent-amplitude fault 903 is a one-level amplitude change, "A4-P4" being altered to "A3-P4". The adjacent-phase fault 904 shows the phase modulation changed by one. The non-adjacent fault 905 has the amplitude changed by 3 levels.

The receiver can determine the message fault types by comparing the message elements of faulted and unfaulted versions in a similar way, and thereby assist in selecting a more suitable modulation scheme, as shown in the next figure. In contrast, a fault in 16QAM generally alters both I and Q branches in complex ways, and therefore is difficult for a receiver to determine the fault type, whether amplitude or phase fault.

FIG. 10 is a schematic showing an exemplary embodiment of a method to select a modulation table based on types of faults observed, according to some embodiments. As depicted in this non-limiting example, a strategy for selecting a change in modulation can be based on the type of faults detected. For example, responsive to adjacent-amplitude faults, the receiver can suggest switching to a modulation scheme with fewer, and therefore more-spaced-apart, amplitude levels. Adjacent-phase faults may prompt a reduction in the number of phase levels. Non-adjacent faults may require an increase in the number of sum-signal amplitude and sum-signal phase levels, in order to shorten the exposure time of messages and thereby (attempt to) evade pulsatile strong interference. If, however, the faults are uniformly spread throughout the modulation scheme, the best solution may be to increase the transmission power, or alternatively to wait until the interference subsides. In persistent cases, a nice message from the victim core network to the intruder core network may prompt a solution.

Due to the many options and variations disclosed herein, and other versions derived therefrom by artisans after reading this disclosure, it would be helpful for a wireless standards committee to establish conventions governing formats and implementation options for sum-signal modulation as disclosed, so that future wireless users can enjoy phase-noise mitigation and amplitude-noise mitigation with each communication.

The wireless embodiments of this disclosure may be aptly suited for cloud backup protection, according to some embodiments. Furthermore, the cloud backup can be provided cyber-security, such as blockchain, to lock or protect data, thereby preventing malevolent actors from making changes. The cyber-security may thereby avoid changes that, in some applications, could result in hazards including lethal hazards, such as in applications related to traffic safety, electric grid management, law enforcement, or national security.

In some embodiments, non-transitory computer-readable media may include instructions that, when executed by a computing environment, cause a method to be performed, the method according to the principles disclosed herein. In some embodiments, the instructions (such as software or firmware) may be upgradable or updatable, to provide additional capabilities and/or to fix errors and/or to remove security vulnerabilities, among many other reasons for updating software. In some embodiments, the updates may be provided monthly, quarterly, annually, every 2 or 3 or 4 years, or upon other interval, or at the convenience of the owner, for example. In some embodiments, the updates (especially updates providing added capabilities) may be provided on a fee basis. The intent of the updates may be to cause the updated software to perform better than previously, and to thereby provide additional user satisfaction.

The systems and methods may be fully implemented in any number of computing devices. Typically, instructions are laid out on computer readable media, generally non-transitory, and these instructions are sufficient to allow a processor in the computing device to implement the method of the invention. The computer readable medium may be a hard drive or solid state storage having instructions that, when run, or sooner, are loaded into random access memory. Inputs to the application, e.g., from the plurality of users or from any one user, may be by any number of appropriate computer input devices. For example, users may employ vehicular controls, as well as a keyboard, mouse, touchscreen, joystick, trackpad, other pointing device, or any other such computer input device to input data relevant to the calculations. Data may also be input by way of one or more sensors on the robot, an inserted memory chip, hard drive, flash drives, flash memory, optical media, magnetic media, or any other type of file—storing medium. The outputs may be delivered to a user by way of signals transmitted to robot steering and throttle controls, a video graphics card or integrated graphics chipset coupled to a display that may be seen by a user. Given this teaching, any number of other tangible outputs will also be understood to be contemplated by the invention. For example, outputs may be stored on a memory chip, hard drive, flash drives, flash memory, optical media, magnetic media, or any other type of output. It should also be noted that the invention may be implemented on any number of different types of computing devices, e.g., embedded systems and processors, personal computers, laptop computers, notebook computers, net book computers, handheld computers, personal digital assistants, mobile phones, smart phones, tablet computers, and also on devices specifically designed for these purpose. In one implementation, a user of a smart phone or Wi-Fi-connected device downloads a copy of the application to their device from a server using a wireless Internet connection. An appropriate authentication procedure and secure transaction process may provide for payment to be made to the seller. The application may download over the mobile connection, or over the Wi-Fi or other wireless network connection. The application may then be run by the user. Such a networked system may provide a suitable computing environment for an implementation in which a plurality of users provide separate inputs to the system and method.

It is to be understood that the foregoing description is not a definition of the invention but is a description of one or more preferred exemplary embodiments of the invention. The invention is not limited to the particular embodiments(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the specific combination and order of steps is just one possibility, as the present method may include a combination of steps that has fewer, greater, or different steps than that shown here. All such other embodiments, changes, and modifications are intended to come within the scope of the appended claims.

As used in this specification and claims, the terms "for example", "e.g.", "for instance", "such as", and "like" and the terms "comprising", "having", "including", and their other verb forms, when used in conjunction with a listing of one or more components or other items, are each to be construed as open-ended, meaning that the listing is not to be considered as excluding other additional components or items. Other terms are to be construed using their broadest reasonable meaning unless they are used in a context that requires a different interpretation.

The invention claimed is:

1. A method for a base station of a wireless network to communicate with a user device of the wireless network, the method comprising:
 a) determining or receiving a data message to be transmitted to the user device;
 b) modulating each message element of the data message according to a first modulation scheme, each message element occupying a single resource element of a resource grid comprising symbol-times in time and subcarriers in frequency;
 c) transmitting the data message, so modulated, to the user device;
 d) receiving an uplink message from the user device, the uplink message indicating which particular type of message faults, of a plurality of predetermined fault types, were received; and
 e) selecting a second modulation scheme configured to avoid the particular type of message faults.

2. The method of claim 1, wherein the data message is transmitted according to 5G or 6G technology.

3. The method of claim 1, wherein the first modulation scheme comprises amplitude modulation according to integer Namp predetermined amplitude levels, multiplexed with phase modulation according to integer Nphase predetermined phase levels.

4. The method of claim 3, wherein:
 a) the user device demodulates the data message according to the first modulation scheme; and
 b) the plurality of predetermined fault types comprises amplitude faults and phase faults;
 c) wherein an amplitude fault comprises a message element differing in amplitude, as received, from the message element as transmitted, and a phase fault comprises a message element differing in phase, as received, from the message element as transmitted.

5. The method of claim 4, further comprising:
 a) when the particular fault type is amplitude fault, selecting, as the second modulation scheme, a modulation scheme with less than Namp predetermined amplitude levels; and
 b) when the particular fault type is phase fault, selecting, as the second modulation scheme, a modulation scheme with less than Nphase predetermined phase levels.

6. The method of claim 5, wherein the second modulation scheme comprises integer Mamp predetermined amplitude levels and integer Mphase predetermined phase levels, wherein Mamp is different from Mphase.

7. The method of claim 4, wherein the plurality of predetermined fault types further comprises non-adjacent faults, wherein a non-adjacent fault comprises a message element differing in both amplitude and phase, as received, from the message element as transmitted.

8. The method of claim 7, further comprising:
a) when the particular fault type is non-adjacent fault, selecting, as the second modulation scheme, a modulation scheme with less than Namp predetermined amplitude levels and less than Nphase phase levels.

9. The method of claim 1, further comprising:
a) upon receiving the uplink message, transmitting a message to the user device using the second modulation scheme, and determining that an interference background level is above a threshold value;
b) then, at a later time, determining that the interference background level has dropped below the threshold value; and
c) then transmitting another message to the user device using the first modulation scheme.

10. A method for a wireless receiver to receive a message comprising message elements, each message element occupying exactly one resource element of a resource grid, the method comprising:
a) using a modulation scheme comprising amplitude modulation multiplexed with phase modulation, the amplitude modulation according to integer Namp predetermined amplitude levels and the phase modulation according to integer Nphase predetermined phase levels;
b) receiving a demodulation reference comprising a first resource element and a second resource element, wherein the first resource element comprises a maximum amplitude level of the Namp predetermined amplitude levels and a particular predetermined phase level of the Nphase phase levels, and wherein the second resource element comprises zero transmission;
c) receiving the message comprising message elements;
d) demodulating each message element by comparing an amplitude of the message element to the Namp predetermined amplitude levels and comparing a phase of the message element to the Nphase predetermined phase levels.

11. The method of claim 10, further comprising:
a) for each message element, extracting an I-branch signal comprising an I-branch amplitude and an orthogonal Q-branch signal comprising a Q-branch amplitude; and
b) for each message element, determining an overall amplitude comprising a square root of a sum of the I-branch amplitude squared plus the Q-branch amplitude squared, and determining an overall phase comprising an arctangent of a ratio of the Q-branch amplitude divided by the I-branch amplitude.

12. The method of claim 11, wherein the demodulating each message element comprises:
a) selecting a closest predetermined amplitude level, of the Namp predetermined amplitude levels, to the overall amplitude; and
b) selecting a closest predetermined phase level, of the Nphase predetermined phase levels, to the overall phase.

13. The method of claim 10, further comprising:
a) determining, according to a background signal received during the second resource element of the demodulation reference, a background amplitude and a background phase;
b) calculating, according to the background phase, a phase correction; and
c) for each message element, correcting the phase of the message element according to the background phase.

14. The method of claim 13, further comprising:
a) calculating, according to the background amplitude and the background phase, an amplitude correction; and
b) for each message element, correcting the amplitude of the message element according to the background amplitude and the background phase.

15. The method of claim 14, wherein the correcting the amplitude of the message element according to the background amplitude and the background phase comprises:
a) for each message element, calculating an amplitude correction comprising a cosine of a phase difference between the background phase and the phase of the message element; and
b) subtracting the amplitude correction from the amplitude of the message element.

16. A method for a base station of a wireless network to communicate with a user device of the network, the method comprising:
a) selecting a first modulation scheme comprising amplitude modulation multiplexed with phase modulation, the amplitude modulation comprising integer Namp predetermined amplitude levels and the phase modulation comprising integer Nphase predetermined phase levels;
b) transmitting a downlink message to the user device according to the first modulation scheme;
c) receiving, from the user device, an uplink message indicating a number or rate of faults and one or more types of the faults; and
d) selecting a second modulation scheme configured to mitigate the type or types of faults indicated by the user device.

17. The method of claim 16, wherein:
a) the types of faults comprise amplitude faults and phase faults;
b) wherein an amplitude fault comprises a message element that is transmitted with a first amplitude level of the Namp predetermined amplitude levels, and is demodulated, by the user device, according to a second amplitude level, different from the first amplitude level; and
c) wherein a phase fault comprises a message element that is transmitted with a first phase level of the Nphase predetermined phase levels, and is demodulated, by the user device, according to a second phase level, different from the first phase level.

18. The method of claim 17, further comprising:
a) when the uplink message indicates amplitude faults, selecting, as the second modulation scheme, a modulation scheme comprising integer Mamp predetermined amplitude levels, Mamp less than Namp; and
b) when the uplink message indicates phase faults, selecting, as the second modulation scheme, a modulation scheme comprising integer Mphase predetermined phase levels, Mphase less than Nphase.

19. The method of claim 18, wherein Namp is different from Nphase.

20. The method of claim 16, further comprising:
a) upon receiving the uplink message, measuring an interference background level;
b) after selecting the second modulation scheme and transmitting a message to the user device according to the second modulation scheme, again measuring the interference background level, and determining that the interference background level has dropped below a predetermined threshold level; and c) then transmitting a message to the user device indicating an intention to resume using the first modulation scheme.

* * * * *